(12) United States Patent
Le Gallo-Bourdeau et al.

(10) Patent No.: US 11,531,898 B2
(45) Date of Patent: Dec. 20, 2022

(54) TRAINING OF ARTIFICIAL NEURAL NETWORKS

(71) Applicant: International Business Machines Corporation, Armonk, NY (US)

(72) Inventors: Manuel Le Gallo-Bourdeau, Zurich (CH); Riduan Khaddam-Aljameh, Zurich (CH); Lukas Kull, Thalwil (CH); Pier Andrea Francese, Adliswil (CH); Thomas H. Toifl, Gattikon (CH); Abu Sebastian, Adliswil (CH); Evangelos Stavros Eleftheriou, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 16/413,738

(22) Filed: May 16, 2019

(65) Prior Publication Data

US 2020/0364577 A1    Nov. 19, 2020

(51) Int. Cl.
*G06N 3/063* (2006.01)
*G06N 3/08* (2006.01)
*G06F 7/544* (2006.01)

(52) U.S. Cl.
CPC ............ *G06N 3/084* (2013.01); *G06F 7/5443* (2013.01); *G06N 3/063* (2013.01)

(58) Field of Classification Search
CPC ...... G06F 7/5443; G06N 3/084; G06N 3/063; G06N 3/02; G06N 3/08

(Continued)

(56) References Cited

U.S. PATENT DOCUMENTS 10,942,673 B2 * 3/2021 Shafiee Ardestani ................ G06F 3/0659
2016/0358075 A1 12/2016 Zhang
(Continued)

FOREIGN PATENT DOCUMENTS

WO    2018173472 A1    9/2018

OTHER PUBLICATIONS

Notification of Transmittal of The International Search Report and The Written Opinion of The International Searching Authority, or The Declaration, issued in International Application No. PCT/EP2020063194, dated Aug. 4, 2020; 12 pages.
(Continued)

*Primary Examiner* — Jacinta M Crawford
(74) *Attorney, Agent, or Firm* — Cantor Colburn LLP; Daniel Morris (57) ABSTRACT

Methods and apparatus are provided for training an artificial neural network having a succession of neuron layers with interposed synaptic layers each having a respective set of N-bit fixed-point weights {w} for weighting signals propagated between its adjacent neuron layers, via an iterative cycle of signal propagation and weight-update calculation operations. Such a method includes, for each synaptic layer, storing a plurality p of the least-significant bits of each N-bit weight w in digital memory, and storing the next n-bit portion of each weight w in an analog multiply-accumulate unit comprising an array of digital memory elements. Each digital memory element comprises n binary memory cells for storing respective bits of the n-bit portion of a weight, where $n \geq 1$ and $(p+n+m)=N$ where $m \geq 0$ corresponds to a defined number of most-significant zero bits in weights of the synaptic layer.

25 Claims, 5 Drawing Sheets

(58) Field of Classification Search
USPC .............................. 345/530; 706/15, 16, 22
See application file for complete search history.

(56) References Cited

U.S. PATENT DOCUMENTS

| | | |
|---|---|---|
| 2018/0315159 A1 | 11/2018 | Ould-Ahmed-Vall et al. |
| 2019/0042199 A1 | 2/2019 | Sumbul |
| 2019/0392289 A1 | 12/2019 | Otsuka |
| 2020/0026991 A1* | 1/2020 | Lin ..................... G11C 7/1006 |
| 2020/0185027 A1* | 6/2020 | Rom ...................... G11C 11/54 |

OTHER PUBLICATIONS

Ambrogio et al., "Equivalent-Accuracy Accelerated Neural-Network Training Using Analogue Memory," Nature 558.7708, 2018, pp. 60-67.

Biswas et al., "Conv-RAM: An Energy-Efficient SRAM with Embedded Convolution Computation for Low-Power CNN-Based Machine Learning Applications," 2018 IEEE International Solid-State Circuits Conference-(ISSCC), IEEE, 2018, 3 pages.

Jaiswal et al., "8T SRAM Cell as a Multi-bit Dot Product Engine for Beyond von-Neumann Computing," arXiv preprint arXiv: 1802.08601, 2018, 10 pages.

Nandakumar et al., "Mixed-precision architecture based on computational memory for training deep neural networks," 2018 IEEE International Symposium on Circuits and Systems (ISCAS), IEEE, 2018, 5 pages.

Nandakumar et al., "Mixed-precision training of deep neural networks using computational memory," arXiv preprint arXiv: 1712.01192, 2017, 9 pages.

* cited by examiner

TRAINING OF ARTIFICIAL NEURAL NETWORKS

BACKGROUND

The present invention relates generally to training of artificial neural networks.

Artificial neural networks (ANNs) have been developed to perform computational tasks in a manner inspired by biological architectures of the nervous system. These networks are based on a fundamental principle of biological systems whereby neurons are interconnected via synapses which relay weighted signals between the neurons. ANNs are based on a logical structure comprising a succession of layers of neurons with interposed synaptic layers. The synaptic layers store the weights for weighting signals propagated between neurons in their adjacent neuron layers. A neuron $n_i$ in a given layer may be connected to one or more neurons $n_j$ in the next layer, and a different weight $w_{ij}$ can be associated with each neuron-neuron connection $n_i$-$n_j$ for weighting signals transmitted from $n_i$ to $n_j$. Each neuron generates output signals dependent on its accumulated weighted inputs, whereby weighted signals can be propagated over successive layers of the network.

ANNs have been successfully applied in various complex analysis tasks such as speech and image recognition, e.g. classification of hand-written digits based on the MNIST (Modified National Institute of Standards and Technology) dataset. An ANN undergoes a training phase in which the sets of weights for respective synaptic layers are determined. The network is exposed to a set of training data, e.g. image data for hand-written digits, in an iterative training process in which the weights are repeatedly updated as the network "learns" from the training data. Training involves an iterative cycle of signal propagation and weight-update calculation operations, with the network weights being progressively updated until a convergence condition is achieved. The resulting trained network, with weights defined via the training operation, can then be applied to new (unseen) data to perform inference tasks for the application in question.

Training of ANNs, which may have multiple neuron layers and millions of synaptic weights, is a compute- and time-intensive task. Training methods using analog multiply-accumulate units based on arrays of memristive synapses, in which the synaptic weights are stored in the analog conductance values of memristive devices such as PCM (phase change memory) devices, have been proposed to alleviate these problems. These units employ crossbar arrays of memristive devices which are connected between row and column lines for applying signals to the devices, where each device implements a synapse with a weight corresponding to the (variable) device conductance. The parallel computational capabilities of these multiply-accumulate arrays can be exploited to perform inexpensive vector-matrix computations (as required to generate the accumulated-weighted signals propagated over a synaptic layer) in the analog domain with O(1) computational complexity. Such a training method, in which updates to a synaptic weight during training are accumulated in a high-precision digital accumulator, is known in the art. An analog multiply-accumulate unit in which 1-bit weights are stored digitally in binary SRAM (static random-access memory) cells for neural network inference computations is also known in the art.

There remains a need for further neural network training systems offering reduced complexity while preserving training accuracy.

SUMMARY

According to at least one embodiment of the present invention there is provided a method for training an artificial neural network, having a succession of neuron layers with interposed synaptic layers each having a respective set of N-bit fixed-point weights $\{w\}$ for weighting signals propagated between its adjacent neuron layers, via an iterative cycle of signal propagation and weight-update calculation operations. The method includes, for each synaptic layer, storing a plurality p of the least-significant bits of each N-bit weight w in digital memory, and storing the next n-bit portion of each weight w in an analog multiply-accumulate unit comprising an array of digital memory elements. Each digital memory element comprises n binary memory cells for storing respective bits of the n-bit portion of a weight, where $n \geq 1$ and $(p+n+m)=N$ where $m \geq 0$ corresponds to a defined number of most-significant zero bits in weights of the synaptic layer. The method also includes performing a signal propagation operation by supplying signals to be weighted by the synaptic layer to the multiply-accumulate unit to obtain accumulated weighted signals dependent on the stored n-bit portions of the weights, and performing a weight-update calculation operation in a digital processing unit, operatively coupled to the digital memory and multiply-accumulate unit, to calculate updated weights for the synaptic layer in dependence on signals propagated by the neuron layers. The method further comprises periodically reprogramming the digital memory and the multiply-accumulate unit to store said bits of the updated weights.

In training methods embodying the invention, weights are defined in an N-bit fixed-point format with a desired precision for the training operation. For each N-bit weight w, (at least) the p least-significant bits of the weight are stored in digital memory. The next n-bit portion (i.e. the n next-most-significant bits) is stored digitally in n binary memory cells of a digital memory element of the analog multiply-accumulate unit. This n-bit portion corresponds to a reduced-precision weight value for the weight w. Multiply-accumulate operations are performed with these reduced-precision weights during signal propagation operations. In weight-update operations, updated N-bit weights for the synaptic layer are calculated in the digital processing unit. The weight-update calculation is thus performed with digital precision, and the digital memory and multiply-accumulate unit are periodically reprogrammed to store the appropriate bits (i.e. the p least-significant bits and n-bit portion respectively) of the updated weights. By using N-bit fixed point weights stored in a combination of digital memory and digital elements of a multiply-accumulate array, this method combines advantages of accuracy in the weight-update operation with fast, low complexity vector-matrix computations for signal propagation. The vector-matrix operations are performed with reduced-precision weights, reducing complexity and hence power and on-chip area of the multiply-accumulate unit. Embodiments of the invention thus offer fast, efficient ANN training methods based on multiply-accumulate arrays.

The parameter m may be defined as m=0 for the synaptic layers, regardless of the actual number of most-significant zero bits in weights of any given layer. This gives a simple implementation in which (p+n)=N. In other embodiments of the invention, an initial value of m may be defined for a synaptic layer in dependence on the number of most-significant zero bits in that layer's weights $\{w\}$, and the value of m may then be adjusting dynamically during training as the number of most-significant zero bits in the weight-set {w} changes. In these embodiments of the invention, at least p=(N−n−m) least-significant bits of the weights w are stored in digital memory, and the n-bit portions stored in the multiply-accumulate unit are redefined and reprogrammed dynamically as the value of m is adjusted during training. This gives more optimal definition of the reduced-precision weights for the various network layers, enhancing training accuracy.

In some embodiments of the invention, only the p least-significant bits of each N-bit weight are stored in digital memory. The digital memory may be distributed in the multiply-accumulate unit such that each N-bit weight is stored in a unit cell which comprises p-bits of digital memory, storing the p least-significant bits of that weight, and a digital memory element storing the n-bit portion of that weight. This offers an area-efficient implementation for a combined digital/analog memory unit based on unit cells with small-footprint.

In other embodiments of the invention, all N bits of each N-bit weight may be stored in a digital memory unit providing the digital memory. This offers efficient operation in which weight-updates are performed in the digital memory, permitting less-frequent updates to the reduced-precision weights in the multiply accumulate unit. For example, the reduced precision weights may be updated only after a number of batches of training examples has been processed by the network. To further enhance efficiency of weight-update operations, the n-bit portion of an updated weight may only be copied from digital memory to the multiply-accumulate unit if bit-overflow of the $(N-p)^{th}$ bit occurs during updates to that weight in the digital memory over a training period.

In embodiments of the invention where the N-bit weights of all synaptic layers are stored in digital memory, the multiply-accumulate unit may be re-used for the reduced-precision weights of different layers as signal propagation progresses through the network. As successive sets of the synaptic layers become active for signal propagation, the n-bit portions of weights of those layers can be dynamically stored in the array of digital memory elements.

At least one further embodiment of the invention provides apparatus for implementing an artificial neural network in an iterative training cycle of signal propagation and weight-update calculation operations. The apparatus comprises digital memory storing a plurality p of the least-significant bits of each N-bit weight w of each synaptic layer, and an analog multiply-accumulate unit for storing the next n-bit portion of each weight w of the synaptic layer. The multiply-accumulate unit comprises an array of digital memory elements, each comprising n binary memory cells, as described above. The apparatus further comprises a digital processing unit operatively coupled to the digital memory and multiply-accumulate unit. The digital processing unit is adapted, in a signal propagation operation, to supply signals to be weighted by each synaptic layer to the multiply-accumulate unit to obtain accumulated weighted signals dependent on the stored n-bit portions of the weights. The digital processing unit is further adapted to perform a weight-update calculation operation to calculate updated weights for each synaptic layer in dependence on signals propagated by the neuron layers, and to control periodic reprogramming of the digital memory and the multiply-accumulate unit to store the appropriate bits of the updated weights.

Embodiments of the invention will be described in more detail below, by way of illustrative and non-limiting example, with reference to the accompanying drawings.

DETAILED DESCRIPTION

Figure 1:
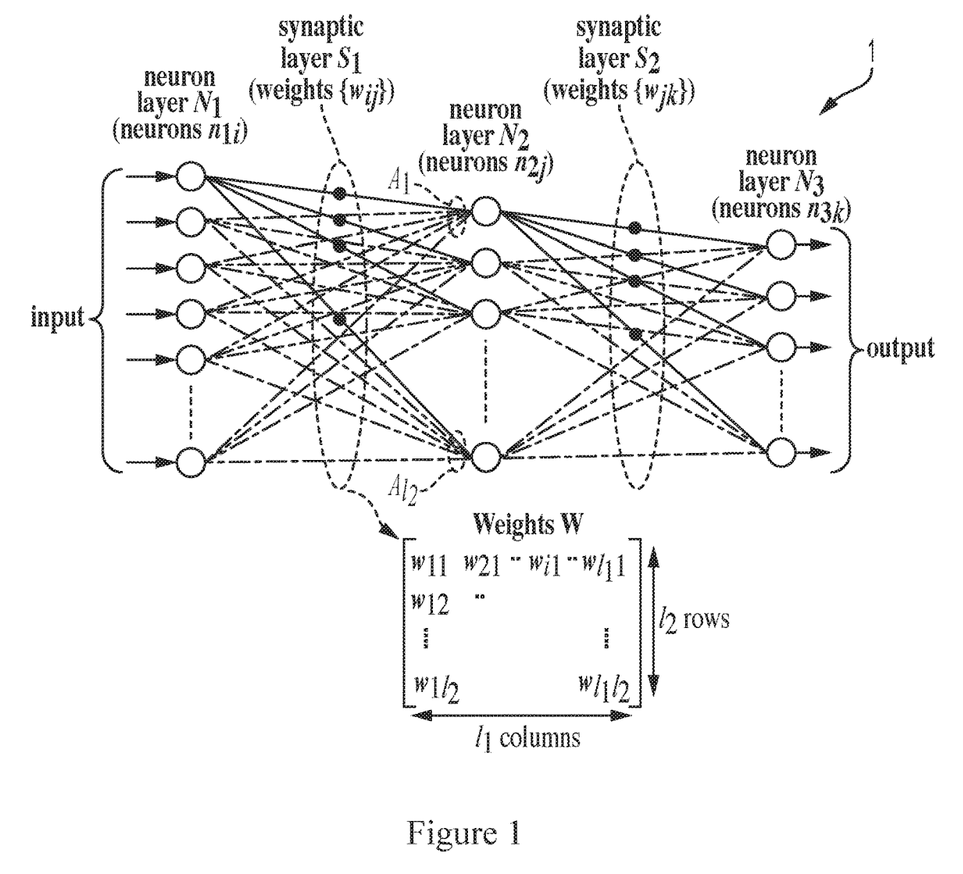
FIG. 1 is a schematic representation of an exemplary ANN.

FIG. 1 shows the logical structure of one example of a fully-connected ANN. The ANN 1 comprises a succession of neuron layers with interposed synaptic layers. In the simple example shown, the network has three neuron layers: a first layer $N_1$ of input neurons which receive the network input signals; a last layer $N_3$ of output neurons which provide the output signals of the network; and an intermediate ("hidden") layer $N_2$ of neurons between the input and output layers. Neurons in layer $N_1$ are denoted here by $n_{1i}$ ($1 \le i \le l_1$), neurons in layer $N_2$ are denoted by $n_{2j}$ ($1 \le j \le l_2$), and neurons in layer $N_3$ are denoted by $n_{3k}$ ($1 \le k \le l_3$), where $l_x$ is the number of neurons in layer $N_x$. All neurons in each layer are connected to all neurons in the next layer as indicated, whereby neuron activation signals from one layer are transmitted to neurons in the next layer. Synaptic layers $S_1$ and $S_2$, interposed with the neuron layers, have respective sets of weights $\{w_{ij}\}$ and $\{w_{jk}\}$ for weighting the signals propagated between their adjacent neuron layers. A weight $w_{ij}$ is defined for each connection between an $N_1$ neuron $n_{1i}$ and an $N_2$ neuron $n_{2j}$, whereby a signal propagated from $n_{1i}$ to $n_{2j}$ is weighted according to the corresponding weight $w_{ij}$ for that neuron pair. The set of weights $\{w_{ij}\}$ for synaptic layer $S_1$ can thus be represented by a matrix W having $l_2$ rows and $l_1$ columns of weights $w_{ij}$ as indicated in the figure. A signal propagated by an $N_2$ neuron $n_{2j}$ to an $N_3$ neuron $n_{3k}$ is similarly weighted by a corresponding weight $w_{jk}$ of synaptic layer $S_2$, and the set of weights $\{w_{jk}\}$ for synaptic layer $S_2$ can be represented by a matrix having $l_3$ rows and $l_2$ columns of weights $w_{jk}$.

Input layer neurons may simply transmit their received input data signals as the activation signals for layer $N_1$. For subsequent layers $N_2$ and $N_3$, each neuron $n_{2j}$, $n_{3k}$ generates an activation signal dependent on its accumulated inputs, i.e. the accumulated weighted activation signals from its connected neurons in the previous layer. Each neuron applies a non-linear activation function $f$ to the result A of this accumulation operation to generate its neuron activation signal for onward transmission. For example, the accumulated input $A_j$ to a neuron $n_{2j}$ is given by a dot product computation $A_j = \sum_{i=1}^{l_1} (w_{ij} x_{1i})$, where is the activation signal from neuron $n_{1i}$. Computing the vector A of accumulated inputs $(A_1, A_2 \ldots A_{l_2})$ to neurons $n_{2j}$ can thus be represented by a matrix-vector multiplication Wx between the matrix W of weights $w_{ij}$ and the vector x of activation signals $x_{1i} = (x_{11}, x_{12} \ldots x_{1l_1})$ from neurons $n_{1i}$. Each $N_2$ neuron $n_{2j}$ then generates its activation signal $x_{2j}$ as $x_{2j} = f(A_j)$ for propagation to layer $N_3$.

While a simple example of a fully-connected network is shown in FIG. 1, in general a neuron in any given layer may be connected to one or more neurons in the next layer, and networks may include one or more (commonly up to 30 or more) successive layers of hidden neurons. Neuron layers may include one or more bias neurons (not shown) which do not receive input signals but transmit bias signals to the next neuron layer. Other computations may also be associated with some ANN layers. In some ANNs, e.g. convolutional neural networks (CNNs), neuron layers may comprise three-dimensional volumes of neurons, with associated three-dimensional weight arrays in synaptic layers, though signal propagation computations can still be expressed in terms of matrix-vector operations.

ANN training involves an iterative cycle of signal propagation and weight-update calculation operations in response to a set of training examples which are supplied as inputs to the network. In supervised learning of hand-written digits, for example, training examples from the MNIST dataset (for which the labels, here digit class from 0 to 9, are known) are repeatedly input to the network. For each training example, the signal propagation operation comprises a forward propagation operation in which signals are forward-propagated from the first to the last neuron layer, and a backpropagation operation in which error signals are propagated back through the network from the last neuron layer. In the forward propagation operation, activation signals x are weighted and propagated, layer-by-layer, through the network as described above. For each neuron in the output layer, the output signal after forward propagation is compared with the expected output (based on the known label) for the current training example to obtain an error signal ε for that neuron. The error signals for the output layer neurons are backpropagated through all layers of the network except the input layer. Error signals backpropagated between adjacent neuron layers are weighted by the appropriate weights of the interposed synaptic layer. Backpropagation thus results in computation of error signals for each neuron layer except the input layer. Updates to the weights of each synaptic layer are then calculated based on signals propagated by the neuron layers in the signal propagation operation. In general, weight updates may be calculated for some or all weights in a given iteration. By way of example, the update $\Delta w_{ij}$ to a weight $w_{ij}$ between a neuron i in one layer and a neuron j in the next layer can be calculated as:

$$\Delta w_{ij} = \eta x_i \varepsilon_j$$

where $x_i$ is the forward-propagated activation signal from neuron i; $\varepsilon_j$ is the back-propagated error signal for neuron j; and η is a predefined learning parameter for the network. The training process thus progressively updates the network weights until a convergence condition is achieved, whereupon the resulting network, with trained weights, can be applied for ANN inference operations.

Figure 2:
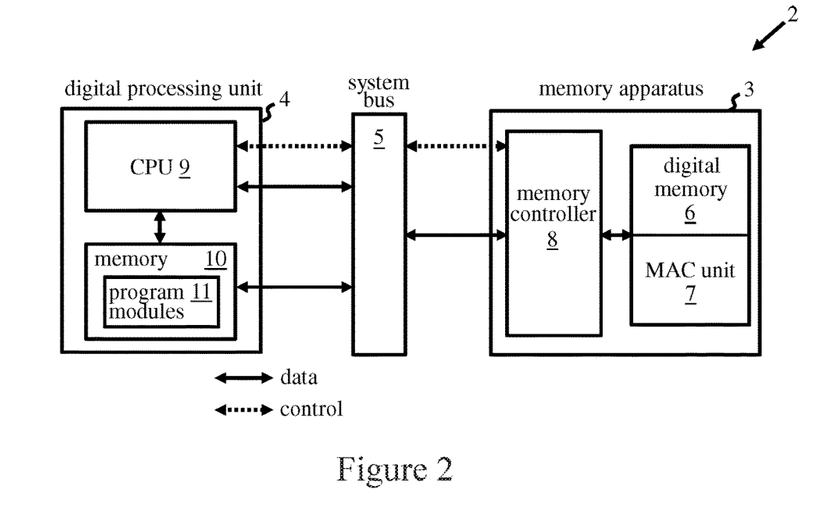
FIG. 2 is a schematic block diagram of apparatus embodying aspects of the invention for implementing an ANN in a training operation.

FIG. 2 shows apparatus embodying aspects of the invention for implementing an ANN 1 in a training operation. The apparatus 2 comprises memory apparatus 3 and a digital processing unit 4 which is operatively coupled, here via a system bus 5, to memory apparatus 3. The memory apparatus 3 comprises digital memory, indicated schematically at 6, and an analog multiply-accumulate (MAC) unit 7. The MAC unit 7 comprises at least one array of digital memory elements, based on binary memory cells, as described further below. Memory control apparatus, indicated as memory controller 8, controls operation of the digital memory 6 and MAC unit 7. Digital processing unit 4 comprises a central processing unit (CPU) 9 and memory 10. Memory 10 stores one or more program modules 11 comprising program instructions executable by CPU 9 to implement functional steps of operations described below.

The DPU 4 controls operation of apparatus 2 in the iterative training process. The DPU is adapted to generate the activation and error signals propagated by the neuron layers in the forward and backpropagation operations, and to perform the weight-update calculations of the training operation. The weight-sets {w} for respective synaptic layers of the network are stored in memory apparatus 3. The weights w are defined in an N-bit fixed-point format where N is selected according to the required precision for a particular training operation. In this embodiment of the invention, N=32 giving high-precision 32-bit fixed-point weights. N could be set differently in other embodiments of the invention, however, e.g. as N=64.

Figure 3:
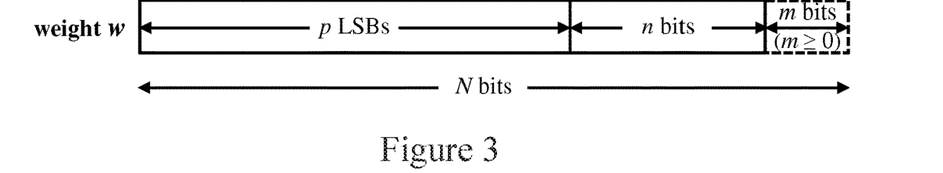
FIG. 3 indicates the bit-structure of a weight w of an ANN layer.

In operation of apparatus 2, the N-bit weights w of a synaptic layer are stored in a combination of digital memory 6 and digital memory elements of MAC unit 7. In particular, referring to FIG. 3, at least a plurality p of the least-significant bits (LSBs) of each weight w are stored in digital memory 6 for each synaptic layer. The next n-bit portion (i.e. the $(p+1)^{th}$ to $(p+n)^{th}$ bits) of each weight w is stored, at least when required for a signal propagation computation, in MAC unit 7. In particular, each n-bit portion is stored in an array of digital memory elements in MAC unit 7. Each of these digital memory elements comprises (at least) n binary memory cells for storing respective bits of the n-bit portion of a weight. The value of n may differ for different synaptic layers. In general, however, n≥1 and (p+n+m)=N, where m≥0 corresponds to a defined number of most-significant zero bits in weights of the synaptic layer. The value of m may thus vary between synaptic layers, and may also be defined as m=0 for any given layer as explained below, in which case (p+n)=N. It can be seen that the n-bit portion of each weight w thus defines a reduced-precision weight value, denoted below by W, for that weight.

Figure 4:
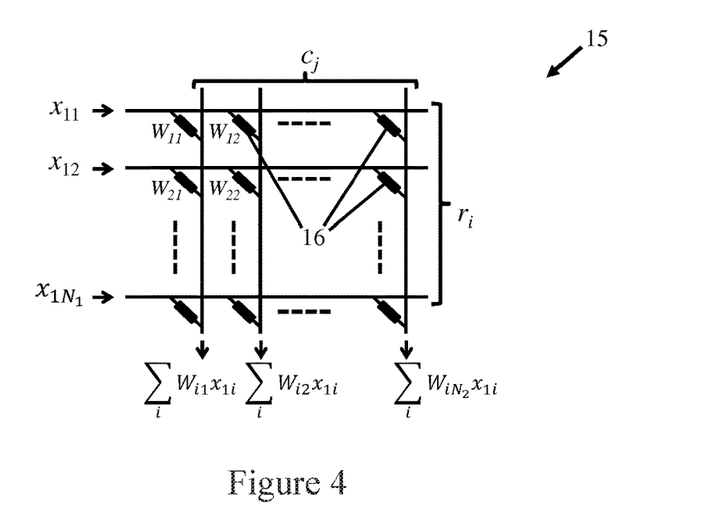
FIG. 4 illustrates structure of an array of digital memory elements in a multiply-accumulate unit of the FIG. 2 apparatus.

FIG. 4 shows the logical structure of an array of digital memory elements in MAC unit 7 storing reduced-precision weights W for a synaptic layer. The array 15 can be conveniently implemented by a crossbar array of digital memory elements 16 (with associated analog circuitry described below) which are connected between row and column lines as illustrated. This example shows a crossbar array storing the reduced-precision weights {$W_{ij}$} for synaptic layer $S_1$ in the FIG. 1 ANN. Each element 16 in the array stores the n bits of a respective reduced-precision weight $W_{ij}$ as indicated. The elements 16 are arranged in logical rows and columns with each device connected between a particular row line $r_i$ and column line $c_j$ for application of signals to that device. The row and column lines are connected to controller 8 of the memory apparatus 2 via row and column digital-to-analog/analog-to-digital converters (not shown) which convert array input/output signals between the digital and analog domains.

In a signal propagation operation for the synaptic layer, the signals generated by DPU 4 are supplied via bus 5 to memory apparatus 2 where controller 8 supplies the signals to an array 15 storing the reduced precision weights $W_{ij}$. In a forward propagation operation, controller 8 supplies the activation signals $x_{1i}$, to row lines $r_i$ of array 15. The resulting output signals on column lines $c_j$ correspond to accumulated weighted signals $\Sigma_i W_{ij} x_{1i}$ which are returned by controller 8 to DPU 4. The backpropagation computation for a synaptic layer can be similarly performed by applying error signals $\varepsilon_j$ to the column lines of the array to obtain accumulated weighted signals $\Sigma_j (W_{ij} \varepsilon_j)$ on the row lines. The array 15 thus implements the matrix-vector computation required for signal propagation across the synaptic layer.

While an exemplary embodiment of apparatus 2 is described, DPU 4 may comprise one or more CPUs which may be implemented by one or more microprocessors. Memory 10 may comprise one or more data storage entities, and may comprise main memory, e.g. DRAM (dynamic random-access memory) and/or other storage which is physically separated from CPU 9, as well as cache and/or other memory local to CPU 9. In general, DPU 4 may be implemented by one or more (general- or special-purpose) computers/programmable data processing apparatus, and functional steps of processing operations performed by DPU 4 may be implemented in general by hardware or software or a combination thereof. Controller 8 may also comprise one or more processors which are configurable by software instructions to control memory apparatus 2 to perform functions described herein. In some embodiments of the invention, DPU 4 and/or controller 8 may include electronic circuitry such as programmable logic circuitry, field-programmable gate arrays (FPGAs), or programmable logic arrays (PLAs) for executing program instructions to implement functions described. Where embodiments of the invention are described with reference to flowchart illustrations, it will be understood that each block of the flowchart illustrations and/or combinations of blocks in the flowchart illustrations can be implemented by computer-executable program instructions. Program instructions/program modules may include routines, programs, objects, components, logic, data structures, and so on that perform particular tasks or implement particular abstract data types. Blocks or combinations of blocks in a flowchart illustration may also be implemented by special-purpose hardware-based systems that perform the specified functions or acts or carry out combinations of special purpose hardware and computer instructions.

System bus 5 may comprise one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The binary memory cells in memory elements 16 of the MAC unit may comprise SRAM cells, DRAM (dynamic RAM) cells, MRAM (magnetoresistive RAM) cells, floating gate cells, RRAM (resistive RAM) cells, or more generally any binary cells for digitally storing respective bits of the reduced-precision weights. Exemplary implementations of analog MAC arrays based on SRAM cells are described in detail below. In general, MAC unit 7 may comprise one or more analog multiply-accumulate arrays, each of which may comprise one or more crossbar arrays of digital memory elements. At any time, MAC unit 7 may store all or a subset of the reduced-precision weights W for one or more synaptic layers. In some embodiments of the invention, all weights W of each synaptic layer may be stored in a respective array of the MAC unit. In others, the MAC unit may store only weights W for a set of (one or more) synaptic layers which are currently active in a signal propagation operation. However, for each synaptic layer S, the training method implemented by apparatus 2 involves the basic steps indicated in the flow diagram of FIG. 5.

Figure 5:
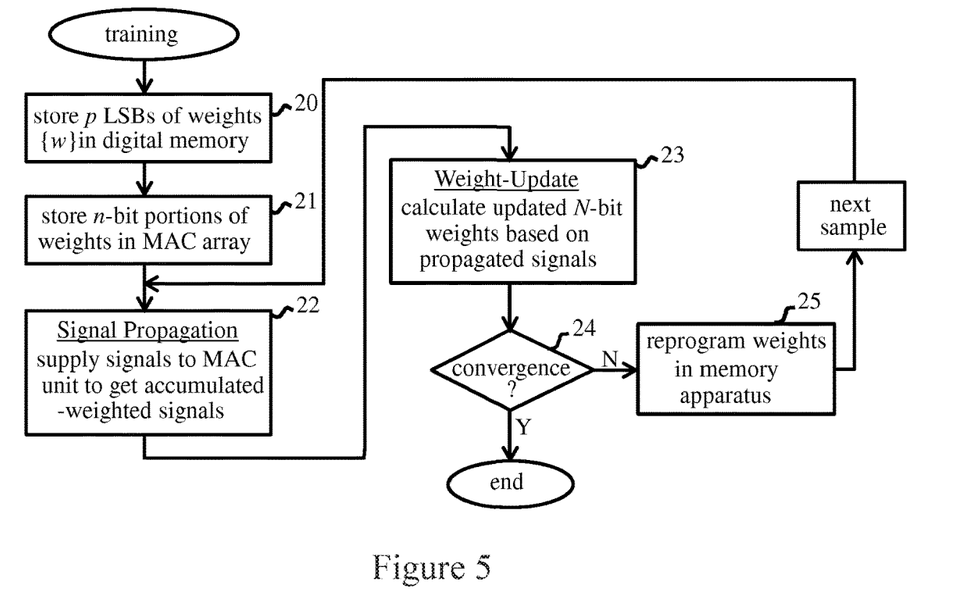
FIG. 5 indicates steps of a training method performed by the FIG. 2 apparatus.

As indicated at step 20 of FIG. 5, at least the p LSBs of each high-precision weight w of the synaptic layer are pre-stored in digital memory 6. The subsequent n-bit portions (i.e. reduced-precision weights W) for weights of the layer are stored (either pre-stored or loaded dynamically) to MAC unit 7 as indicated at step 21. Step 22 represents the signal propagation operation for the synaptic layer. As explained with reference to FIG. 4, for forward propagation the activation signals x are supplied to the MAC array to obtain accumulated weighted signals dependent on the reduced-precision weights W. In the subsequent backpropagation operation, the error signals $\varepsilon$ are supplied to the array to obtain accumulated weighted signals dependent on the weights W. The signals generated in these multiply-accumulate operations are returned to DPU 4. In step 23, DPU 4 calculates updated N-bit weights w for the synaptic layer. Here, weight-updates $\Delta w$ are calculated for respective weights w based on signals propagated by the neuron layers as described above, and each weight is updated to $w = w + \Delta w$. In step 24, the DPU 4 determines if a predetermined convergence condition for the training operation has been achieved. (Convergence can be defined in various known ways, and the particular convergence condition is orthogonal to the operation described herein). If not ("N" at step 24), operation proceeds to step 25 in which DPU 4 controls reprogramming of the weights w in memory apparatus 4. As explained further below, in any given iteration, this step may involve reprogramming bits of the weights stored in digital memory 6, or in both digital memory 6 and MAC unit 7, depending on implementation. However, both the digital memory 6 and the MAC unit 7 are periodically reprogrammed (at the same or different times) during training to store the appropriate bits of the updated weights w. Operation then reverts to step 22 for the next training sample. The process iterates until convergence is detected ("Y" at step 24), whereupon the training operation terminates.

With the above method, weight-updates can be calculated in high precision, here 32-bit precision, in DPU 4 to ensure accuracy of ANN training. In addition, multiply-accumulate computations for signal propagation can be efficiently performed using reduced-precision weights W stored digitally in the analog MAC unit. Using reduced-precision weights here reduces complexity, power consumption and on-chip area of the MAC unit. The value of n can be varied between synaptic layers, providing weights W of a required precision per layer to optimize training. By way of example, n may be set to a value $1 \leq n \leq 8$ on a layer-by-layer basis. Methods embodying aspects of the invention thus offer highly efficient training of artificial neural networks.

Figure 6:
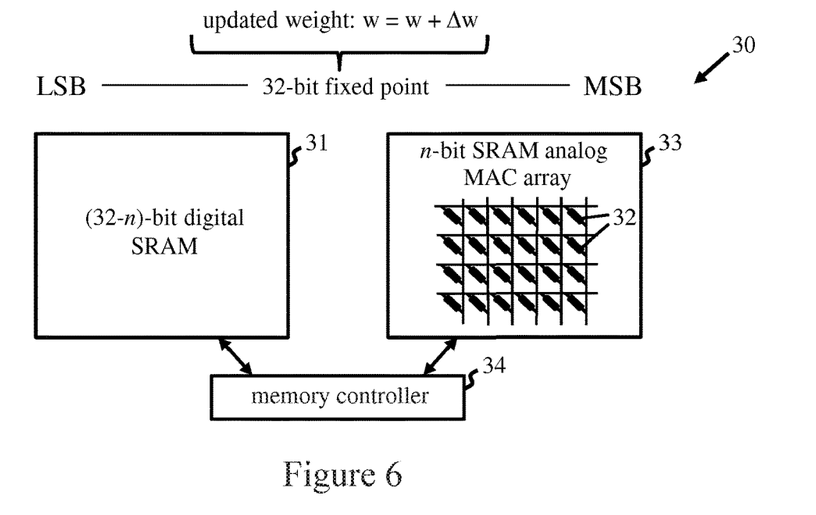
FIG. 6 illustrates structure of memory apparatus in an embodiment of the FIG. 2 apparatus.

FIG. 6 is a schematic representation of the structure of the memory apparatus 3 of FIG. 2 in a first embodiment. For this embodiment, the parameter m is defined as m=0 for all synaptic layers, whereby (p+n)=N, with N=32 in this example. In the memory apparatus 30 of this embodiment, the digital memory is provided by a digital memory (here SRAM) unit 31 which stores only the p=(32−n) LSBs of each 32-bit weight w of a synaptic layer. The reduced precision weights W, defined by the remaining n most-significant bits (MSBs) of respective weights w, are stored in digital memory elements 32 of an SRAM analog MAC array 33 of the MAC unit. A global memory controller 34, common to both digital memory unit 31 and MAC unit 7, effects programming of weights in both memory units and input/output of signals to/from MAC array 33 for signal propagation. After each weight-update calculation (step 23 of FIG. 5), controller 34 stores the updated 32-bit weights w+Δw by reprogramming the p LSBs of weights in digital SRAM 31 and the n-bit portions of the weights in the MAC array 33.

Figure 7:
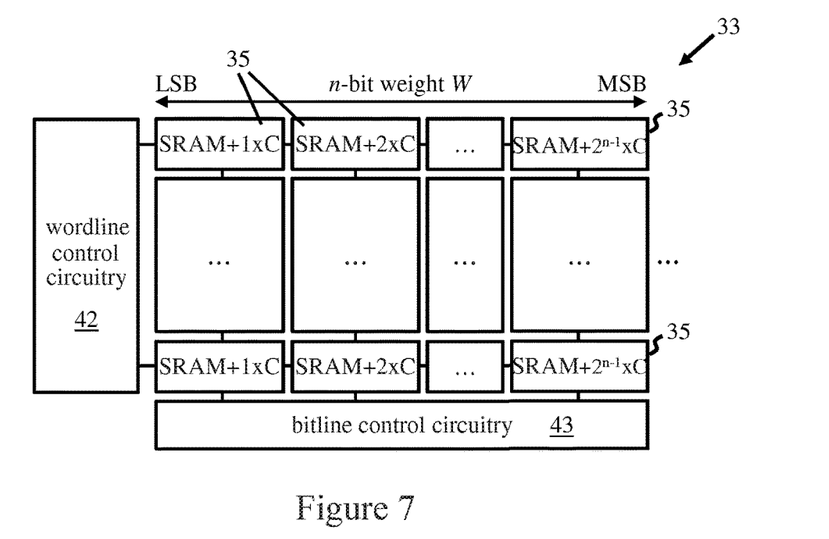
FIG. 7 shows more-detailed structure of an analog SRAM multiply-accumulate array in the FIG. 6 apparatus.
Figure 8:
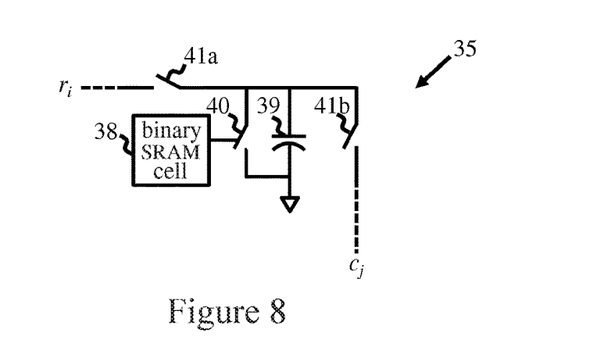
FIG. 8 illustrates structure of an SRAM unit cell in the FIG. 7 array.

FIG. 7 is a more detailed illustration of an embodiment of analog MAC array 33. The array 33 comprises rows and columns of SRAM unit cells 35. Each row provides a digital memory element 32 which stores an n-bit reduced precision weight W. Each of the n bits is stored in a respective unit cell 35 of the element. Each unit cell 35 contains both a binary SRAM cell of a digital memory element 32 and analog circuitry for implementing the analog MAC array. The structure of these unit cells (referred to below as "analog" SRAM cells) is shown in FIG. 8. Each unit cell 35 comprises a binary SRAM cell 38, a capacitor 39, and switches 40, 41a and 41b connected as shown. The size of the capacitor 39 in each unit cell depends on the power of two corresponding to the bit stored in the connected binary cell 38. The first column of unit cells 35 in FIG. 7 stores the LSB of each n-bit weight. If capacitors 39 in these cells have capacitance C, then: capacitors 39 in the second column of unit cells have capacitance ($2^1 \times C$); capacitors in the third column have capacitance ($2^2 \times C$); and so on up to the $n^{th}$ column in which capacitors 39 have capacitance ($2^{n-1} \times C$). Rows of cells 35 are connected to wordline control circuitry 42, and columns of cells 35 are connected to bitline control circuitry 43. This control circuitry comprises standard SRAM circuitry, such as input voltage generators, line driver/decoder circuits, sense amplifiers and ADC/DAC circuits for addressing and reprogramming of cells and input/output of signals as required.

In a multiply-accumulate operation in array 32, the SRAM cells 38 of elements 32 are connected to the appropriate row line $r_i$ of the FIG. 4 array. An input voltage generator applies different analog voltages per row where each voltage corresponds to the value of the input signal x in that row. All capacitors in the analog SRAM cells 35 are charged to that value by closing switch 41a. The input voltages are then turned off and switches 41a opened, so the SRAM cells 38 in the analog units 35 then discharge their adjacent capacitors based on whether these cells store a "0" or a "1". In particular, if cell 38 stores a "0", switch 40 is closed to discharge the capacitor. If cell 38 stores a "1", switch 40 remains open as shown in FIG. 8. This step effectively multiplies the SRAM cell value by the input voltage. Subsequently, switches 41b in the SRAM unit cells connected to the same column line $c_j$ are closed to short all capacitors in the same column, performing an analog add and average operation through charge redistribution on those capacitors. The power of the different bits is accommodated via the exponential sizing of the capacitors. The resulting output voltage on the capacitors in the column lines thus corresponds to the result of the multiply and accumulate operation, and is retrieved via an ADC.

Figure 9:
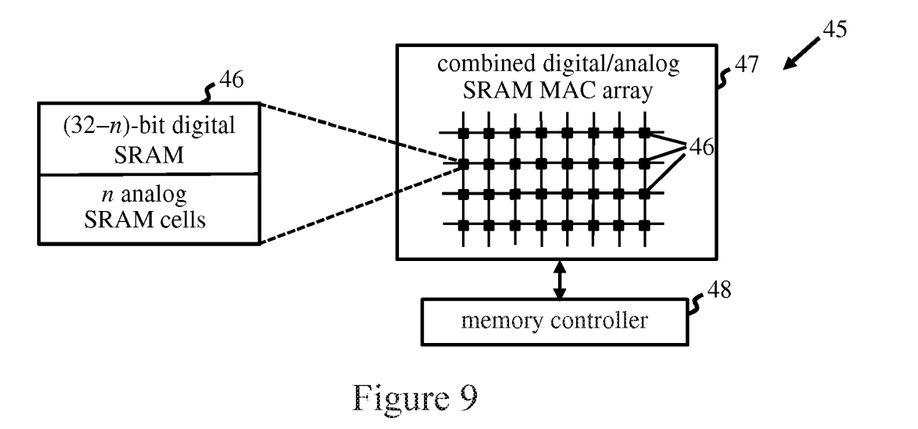
FIG. 9 illustrates memory apparatus in another embodiment of the FIG. 2 apparatus.
Figure 10:
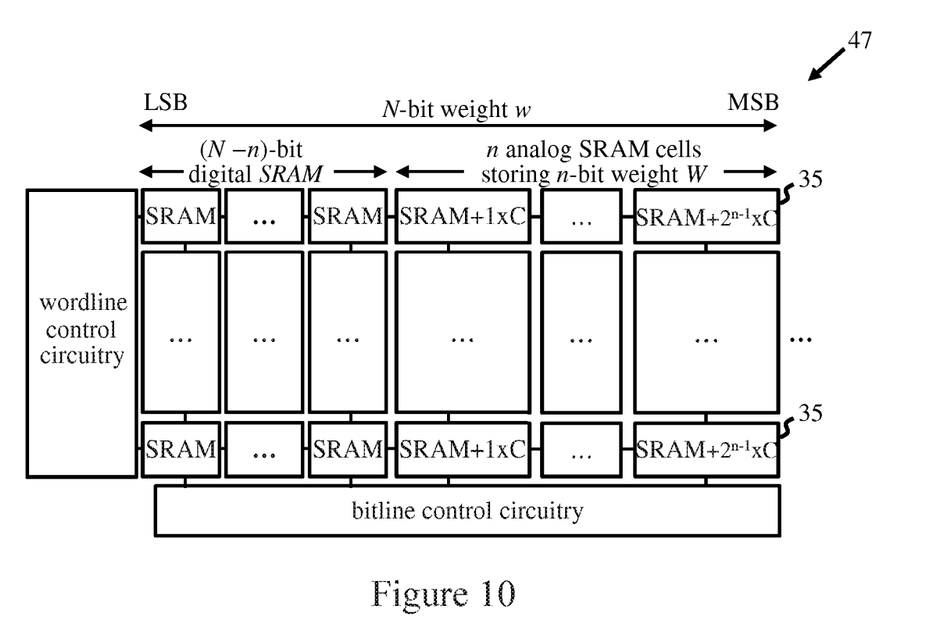
FIG. 10 shows more-detailed structure of a combined digital/analog SRAM unit in the FIG. 9 apparatus.

FIG. 9 shows another embodiment of the memory apparatus. In this memory apparatus 45, the digital memory is distributed in the MAC unit arrays. Each N-bit weight w of a synaptic layer is stored in a unit cell 46 of a combined digital/analog SRAM MAC array 47. Each unit cell 46 comprises p=(32−n)-bits of digital SRAM storing the p LSBs of that weight, and n analog SRAM cells 35 corresponding to a row of the MAC array 33 described above. The binary SRAM cells 38 of these n analog SRAM cells provide the n-bit digital memory element 32 storing the n-bit reduced-precision weight W. A memory controller 48 controls access to analog SRAM cells 35 of unit cells 46 as described above for the multiply-accumulate operations, as well as access to the digital SRAM of unit cells 46. The structure of combined MAC array 47 is shown in more detail in FIG. 10. The combined digital/analog unit cells of this embodiment offer a small on-chip footprint for a highly area-efficient implementation.

Figure 11:
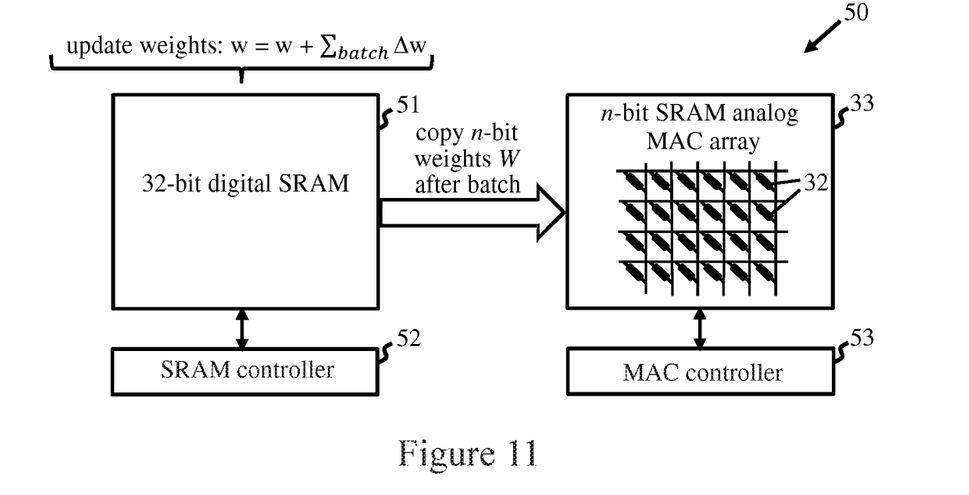
FIG. 11 illustrates memory apparatus in a further embodiment of the FIG. 2 apparatus.

FIG. 11 illustrates structure of a further embodiment of the memory apparatus. Components corresponding to those of FIG. 6 are indicated by like references. This memory apparatus 50 comprises a digital memory (here SRAM) unit 51 which stores all the bits of each 32-bit weight w of a synaptic layer. The n-bit reduced precision weights W are stored in digital memory elements 32 of an SRAM analog MAC array 33 as described above. A standard SRAM controller 52 controls digital SRAM unit 51, and a MAC controller 53 controls MAC array 33 as previously described. In this embodiment, after each weight-update calculation (step 23 of FIG. 5), SRAM controller 52 reprograms the 32-bit weights w stored in digital unit 51 to the updated weights w+Δw. The weight-updates are thus accumulated in digital SRAM 51. Periodically, e.g. after weight-update operations have been performed for a batch of training examples, SRAM controller 52 copies the n-bit reduced-precision weights W from unit 51 to the MAC unit via MAC controller 53. The n-bit portions of the updated 32-bit weights are thus copied to the digital memory elements 32 storing the corresponding reduced-precision weights in MAC array 33. In embodiments of the invention described herein, memory controller 52 can be adapted to copy the n-bit portion of an updated weight w to the MAC unit only if bit-overflow of the $(N-p)^{th}$ bit occurs during the updates to that weight in the batch of weight-update operations. This reduces the number of programming operations for updating the reduced-precision weights, and hence data transfers between SRAM 51 and the MAC unit.

In the memory apparatus of FIGS. 6 and 9, the reduced-precision weights W for each synaptic layer are stored in a respective array of the MAC unit. With the memory structure of FIG. 11, a given MAC array may be re-used for the weights W of different synaptic layers as signal propagation progresses. In particular, under control of DPU 4, SRAM controller 52 may dynamically store the n-bit portions of weights w for successive sets of (one or more) active synaptic layers in a MAC array as a signal propagation operation progresses and different layers become active. The MAC array may be used to perform propagation over the active layers for a batch of training examples, and can then be reprogrammed with the reduced-precision weights for the next set of active layers.

In a modification to the FIG. 11 embodiment, if the weights matrix for a synaptic layer is too large for a MAC array to store all weights W for the layer, a signal propagation operation may be performed by successively storing blocks (effectively sub-matrices) of the weights W in the MAC array, performing the multiply accumulate operations for each block, and then accumulating the resulting signals for all blocks in DPU 4.

Figure 12:
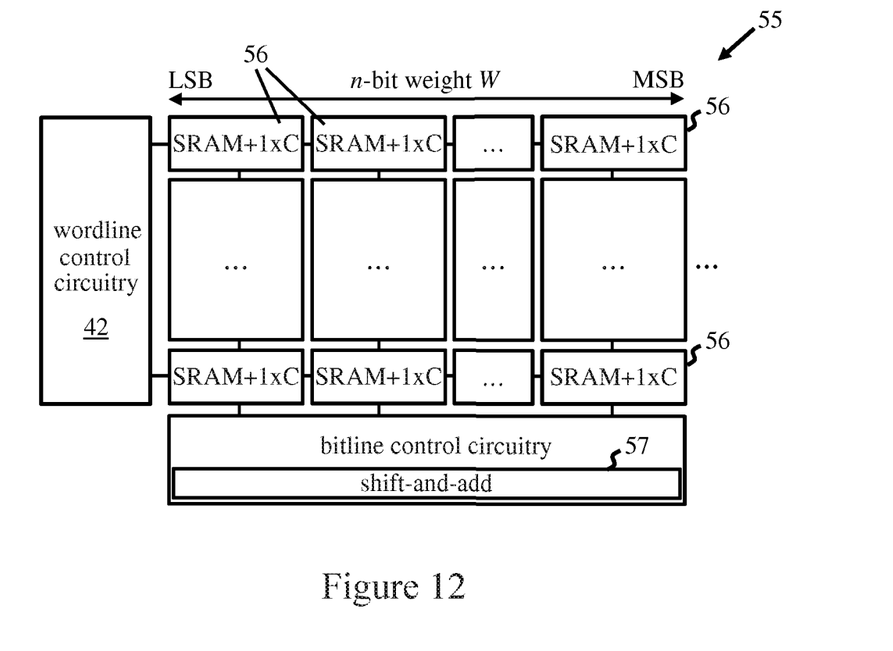
FIG. 12 shows another embodiment of an analog SRAM multiply-accumulate array of the apparatus.

FIG. 12 shows another embodiment of an analog MAC array for use in memory apparatus 2. Components of this array 55 correspond generally to those of FIG. 7, except that all analog SRAM cells 56 of array 55 contain capacitors with the same capacitance C. The array control circuitry of this embodiment includes digital shift-and-add circuitry as indicated at 57. This circuitry performs shift-and-add operations on the outputs on the column lines in a multiply-accumulate operation to accommodate the different powers of two of the bits stored in different columns of cells 56. After digitization of the column-line outputs, circuit 57: shifts the digital output value of the $n^{th}$ column by (n−1) bits; shifts the digital output value of the $(n-1)^{th}$ column by (n−2) bits; and so on. The results from all n columns are then added in circuit 57 to obtain the result of the multiply-accumulate operation for n-bit weights in a column of memory elements in the logical array configuration of FIG. 4. MAC array 55 can also be integrated in a combined digital/analog array structure corresponding to that of FIG. 10.

Depending on the network, weights in different synaptic layers may span different ranges, and it may not be optimal to use the same n bits of the N-bit weights to represent the reduced-precision weights W. This can be addressed by defining an initial value of the parameter m (see FIG. 3) for each synaptic layer in dependence on the number of most-significant zero bits in weights of that layer. In particular, if all weights w in a layer have M (M>0) most-significant zero bits, m may be set to an initial value of m=M. The plurality p of LSBS which are (at minimum) stored in digital memory is then defined as p=(N−n−m). The value of m is adjusted during training, under control of memory controller 8, in dependence on changes in the number of most-significant zero bits in weights of the synaptic layer. In response to adjusting the value of m, the n-bit portions of the weights for the synaptic layer are redefined in accordance with the adjusted value of m. The n-bit portion in FIG. 3 thus effectively "slides" along the N-bit weight value as m changes with the number of zero MSBS in the weights {w}. Memory controller 8 then reprograms the MAC unit when required to store the redefined n-bit portions of the weights. For example, the redefined n-bit portions can be copied from N-bit weights stored in digital SRAM of the memory apparatus.

When m>0 for a synaptic layer, the result of multiply-accumulate operations based on the n-bit weight values in the MAC array can be scaled by $2^{-m}$ in memory controller 8 before supply to DPU 4. Memory controller 8 may decrease the value of m for a layer when bit-overflow of the $(N-m)^{th}$ bit is detected during weight updates to the N-bit weights in digital memory. The memory controller may periodically read the current n-bit weights stored for a layer, and increase m when the MSB of all n-bit weights is zero. This scheme gives more optimal definition of the weights used for multiply-accumulate operations, enhancing accuracy of training.

Numerous changes and modifications can of course be made to the exemplary embodiments of the invention described. For example, while multiply-accumulate operations are performed in MAC unit 7 for both forward and backpropagation operations above, embodiments of the invention can be envisaged in which the MAC unit 7 is used for only one of forward and backpropagation. For example, forward propagation may be performed using MAC unit 7, with backpropagation computations done in DPU 4.

Steps of flow diagrams may be implemented in a different order to that shown and some steps may be performed in parallel where appropriate. In general, where features are described herein with reference to a method embodying aspects of the invention, corresponding features may be provided in apparatus embodying aspects of the invention, and vice versa.

The descriptions of the various embodiments of the present invention have been presented for purposes of illustration, but are not intended to be exhaustive or limited to the embodiments of the invention disclosed. Many modifications and variations will be apparent to those of ordinary skill in the art without departing from the scope and spirit of the described embodiments of the invention. The terminology used herein was chosen to best explain the principles of the embodiments of the invention, the practical application or technical improvement over technologies found in the marketplace, or to enable others of ordinary skill in the art to understand the embodiments of the invention disclosed herein.

The present invention may be a system, a computer implemented method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for training an artificial neural network having a succession of neuron layers with interposed synaptic layers each having a respective set of N-bit fixed-point weights {w} for weighting signals propagated between its adjacent neuron layers, via an iterative cycle of signal propagation and weight-update calculation operations, the method comprising for each synaptic layer:

storing a plurality p of least-significant bits of each N-bit weight w in digital memory;

storing an n-bit portion of each weight w in an analog multiply-accumulate unit comprising an array of digital memory elements, each comprising n binary memory cells for storing respective bits of said n-bit portion of each weight, where $1 \leq n \leq N$ and $(p+n+m)=N$ where $m \geq 0$ corresponds to a defined number of most-significant zero bits in weights of the synaptic layer;

performing a signal propagation operation by supplying signals to be weighted by the synaptic layer to the multiply-accumulate unit to obtain accumulated weighted signals dependent on the stored n-bit portions of the weights;

performing a weight-update calculation operation in a digital processing unit, operatively coupled to said digital memory and multiply-accumulate unit, to calculate updated weights for the synaptic layer in dependence on signals propagated by the neuron layers; and periodically reprogramming the digital memory and the multiply-accumulate unit to store the updated weights.

2. A method as claimed in claim 1, wherein m is defined as m=0 for the synaptic layer, whereby (p+n)=N.

3. A method as claimed in claim 2, wherein only said p least-significant bits of each N-bit weight are stored in said digital memory.

4. A method as claimed in claim 3, wherein said reprogramming is performed by reprogramming both the p least-significant bits of weights in the digital memory and the n-bit portions of weights in the multiply-accumulate unit after a said weight-update calculation operation.

5. A method as claimed in claim 4, wherein said digital memory is provided in a digital memory unit and wherein said reprogramming is performed by a memory controller common to the digital memory unit and the multiply-accumulate unit.

6. A method as claimed in claim 4, wherein said digital memory is distributed in said multiply-accumulate unit such that each N-bit weight is stored in a unit cell which comprises p-bits of digital memory, storing the p least-significant bits of that weight, and a said digital memory element storing said n-bit portion of that weight.

7. A method as claimed in claim 2 including storing all N bits of each N-bit weight in a digital memory unit providing said digital memory.

8. A method as claimed in claim 7, wherein said reprogramming is performed by:
reprogramming the N-bit weights in the digital memory unit to said updated weights after a said weight-update calculation operation; and
periodically copying said n-bit portion of an updated weight in the digital memory unit to said digital memory element storing the n-bit portion of that weight in the multiply-accumulate unit.

9. A method as claimed in claim 8 including copying said n-bit portion of an updated weight to said digital memory element after a batch of weight-update calculation operations.

10. A method as claimed in claim 9 including only copying said n-bit portion of an updated weight to said digital memory element if bit-overflow of the $(N-p)^{th}$ bit occurs during updates to that weight in said batch of weight-update calculation operations.

11. A method as claimed in claim 7 further including:
storing the N-bit weights of all synaptic layers in said digital memory unit; and
dynamically storing the n-bit portions of weights of successive sets of the synaptic layers in said array of digital memory elements to perform a said signal propagation operation.

12. A method as claimed in claim 1 further including:
defining an initial value of m for the synaptic layer in dependence on the number of most-significant zero bits in weights of the synaptic layer;
defining said plurality p for the synaptic layer as $p=(N-n-m)$;
adjusting the value of m during said training in dependence on changes in the number of most-significant zero bits in weights of the synaptic layer; and
in response to adjusting the value of m, redefining said n-bit portions of the weights of the synaptic layer in accordance with the adjusted value of m, and reprogramming said array of digital memory elements to store the redefined n-bit portions of the weights.

13. A method as claimed in claim 1, wherein each said signal propagation operation comprises a forward propagation operation, in which signals are propagated through network from a first neuron layer, and a backpropagation operation in which signals are propagated back through network from a last neuron layer, the method including, for each synaptic layer, supplying signals to be weighted by the synaptic layer in the forward and backpropagation operations to the multiply-accumulate unit.

14. A method as claimed in claim 1 including defining a respective value of n for each synaptic layer.

15. A method as claimed in claim 1, wherein N=32 and n≤8 for each synaptic layer.

16. Apparatus for implementing an artificial neural network having a succession of neuron layers with interposed synaptic layers each having a respective set of N-bit fixed-point weights {w} for weighting signals propagated between its adjacent neuron layers in an iterative training cycle of signal propagation and weight-update calculation operations, the apparatus comprising:

digital memory storing a plurality p of least-significant bits of each N-bit weight w of each synaptic layer;
an analog multiply-accumulate unit for storing an n-bit portion of each weight w of the synaptic layer, the multiply-accumulate unit comprising an array of digital memory elements, each comprising n binary memory cells for storing respective bits of said n-bit portion of each weight, where 1≤n≤N and (p+n+m)=N where m≥0 corresponds to a defined number of most-significant zero bits in weights of the synaptic layer; and
a digital processing unit operatively coupled to said digital memory and multiply-accumulate unit, the digital processing unit being adapted:
in a signal propagation operation, to supply signals to be weighted by each synaptic layer to the multiply-accumulate unit to obtain accumulated weighted signals dependent on the stored n-bit portions of the weights;
to perform a weight-update calculation operation to calculate updated weights for each synaptic layer in dependence on signals propagated by the neuron layers; and
to control periodic reprogramming of the digital memory and the multiply-accumulate unit to store the updated weights.

17. Apparatus as claimed in claim 16, wherein m is defined as m=0 for the synaptic layer, whereby (p+n)=N.

18. Apparatus as claimed in claim 17, wherein only said p least-significant bits of each N-bit weight are stored in said digital memory.

19. Apparatus as claimed in claim 18 including a digital memory unit, providing said digital memory, and a memory controller common to the digital memory unit and the multiply-accumulate unit for performing said reprogramming.

20. Apparatus as claimed in claim 18, wherein said digital memory is distributed in said multiply-accumulate unit such that each N-bit weight is stored in a unit cell which comprises p-bits of digital memory, storing the p least-significant bits of that weight, and a said digital memory element storing said n-bit portion of that weight.

21. Apparatus as claimed in claim 17, wherein all N bits of each N-bit weight are stored in a digital memory unit providing said digital memory.

22. Apparatus as claimed in claim 21, wherein the N-bit weights of all synaptic layers are stored in said digital memory unit, and wherein the apparatus is adapted to dynamically store the n-bit portions of weights of successive sets of the synaptic layers in said array of digital memory elements to perform a said signal propagation operation.

23. Apparatus as claimed in claim 16, wherein the multiply-accumulate unit comprises a respective array of said digital memory elements storing said n-bit portions of the weights of each synaptic layer.

24. Apparatus as claimed in claim 16, wherein an initial value of m is defined for each synaptic layer in dependence on the number of most-significant zero bits in weights of that synaptic layer, and said plurality p for the synaptic layer is defined as $p=(N-n-m)$, and wherein the apparatus is adapted:
to adjust the value of m for a synaptic layer in dependence on changes in the number of most-significant zero bits in weights of the synaptic layer during said training; and
in response to adjusting the value of m, to redefine said n-bit portions of the weights of the synaptic layer in accordance with the adjusted value of m, and to reprogram said array of digital memory elements to store the redefined n-bit portions of the weights.

25. Apparatus as claimed in claim 16, wherein said binary memory cells comprise SRAM cells.

* * * * *